United States Patent
Bai

(10) Patent No.: US 12,178,208 B2
(45) Date of Patent: Dec. 31, 2024

(54) NUTRIENT SOLUTION FORMULA FOR INHIBITING GREEN ALGAE

(71) Applicant: NANJING ZHENGBANG HORTICULTURE TECHNOLOGY CO., LTD., Jiangsu (CN)

(72) Inventor: Hongwu Bai, Jiangsu (CN)

( * ) Notice: Subject to any disclaimer, the term of this patent is extended or adjusted under 35 U.S.C. 154(b) by 581 days.

(21) Appl. No.: 17/606,443

(22) PCT Filed: Aug. 8, 2019

(86) PCT No.: PCT/CN2019/099818
§ 371 (c)(1),
(2) Date: Oct. 25, 2021

(87) PCT Pub. No.: WO2020/215531
PCT Pub. Date: Oct. 29, 2020

(65) Prior Publication Data
US 2022/0192190 A1    Jun. 23, 2022

(30) Foreign Application Priority Data

Apr. 23, 2019  (CN) .......................... 201910328400.8

(51) Int. Cl.
*A01N 33/12*    (2006.01)
*A01P 13/00*    (2006.01)

(52) U.S. Cl.
CPC .............. *A01N 33/12* (2013.01); *A01P 13/00* (2021.08)

(58) Field of Classification Search
None
See application file for complete search history.

(56) References Cited

FOREIGN PATENT DOCUMENTS

| CN | 1775025 A | 5/2006 |
|---|---|---|
| CN | 107353142 A | 11/2017 |
| CN | 107593230 A | 1/2018 |
| CN | 109851440 A | 6/2019 |
| DE | 158502 A | 1/1983 |
| KR | 20020074903 A | * 10/2002 |

OTHER PUBLICATIONS

Elder et al. "Copper cycles and CuSO4 algicidal capacity in two California lakes," Environmental Management 2(1):17-30, 1978 (Year: 1978).*
Li et al., CN 103265372 A, published Aug. 28, 2013, as evidenced by the USPTO translation, printed 2024 (Year: 2024).*
Wikipedia "Plant nutrition," last edited Mar. 6, 2024; https://en.wikipedia.org/wiki/Plant_nutrition (Year: 2024).*
Google translation KR 2002-0074903 A, printed 2024 (Year: 2024).*
Wikipedia "Benzalkonium chloride," last edited Apr. 5, 2024; https://en.wikipedia.org/wiki/Benzalkonium_chloride (Year: 2024).*
Sang et al., CN 101062877 A, published Oct. 31, 2007, as evidenced by the USPTO translation, printed 2024 (Year: 2024).*
Coosemans "Control of algae in hydroponic systems," Acta Horticulturae 382:263-268, 1995 (Year: 1995).*
Perez et al. "Toxicity of benzalkonium chloride on monoalgal cultures and natural assemblages of marine phytoplankton," Water, Air, & Soil Pollution 201:319-330, 2009 (Year: 2009).*

* cited by examiner

*Primary Examiner* — David J Blanchard
*Assistant Examiner* — Alissa Prosser
(74) *Attorney, Agent, or Firm* — Zhigang Ma

(57) ABSTRACT

The invention discloses a nutrient solution formula for inhibiting green algae, comprising a basic nutrient solution and an algae inhibitory substance, wherein the basic nutrient solution comprises major elements, minor elements and trace elements. The specific ratio is: 1000 mg/L of calcium nitrate, 1000 mg/L of potassium nitrate, 200 mg/L of EDTA-FeNa, 200 mg/L of potassium dihydrogen phosphate, 150 mg/L of ammonium dihydrogen phosphate, 700 mg/L of magnesium sulfate, 7 mg/L of boric acid, 5 mg/L of manganese sulfate, 15 mg/L of ferrous sulfate, 0.25 mg/L of copper sulfate, 0.22 mg/L of zinc sulfate, 0.02 mg/L of ammonium molybdate, and 0.01 mg/L of benzalkonium chloride. The benzalkonium chloride can provide Cl ions, and it has a good bactericidal and algae-killing ability in different pH value ranges; the optimal dosage is 0.01 mg/L.

2 Claims, No Drawings

NUTRIENT SOLUTION FORMULA FOR INHIBITING GREEN ALGAE

BACKGROUND OF THE INVENTION

1. Field of the Invention

The invention relates to the field of soilless culture, in particular to a hydroponic leaf vegetable nutrient solution formula capable of inhibiting the growth of green algae and a preparation method thereof.

2. Description of the Related Art

Many scholars at home and abroad are conducting research on the formula of soilless culture. The formula of the nutrient solution is based on the chemical composition of the soil extract, and the widely used formulas include: Hoagland formula, Yamazaki formula and Japanese vegetable garden experimental formula. The Hoagland formula is more suitable for cucumber seedlings. The Yamazaki formula has been improved in different proportions for different crops. The Japanese vegetable garden experimental formula is more general, but the growth of green algae in the nutrient solution is still unavoidable.

According to the environmental conditions necessary for the growth and development of crops, inactive solid substrates and nutrient solutions are used to replace natural soils to provide temperature, water, oxygen and nutrients to the crops, so that hydroponic plants can grow normally and complete their entire life cycle of growth. There are many planktonic algae spores invisible to the naked eye in the water, and the nutrient solution contains a lot of nutrients. In the case of sufficient light, the green algae are easy to multiply in large numbers, and adhere to the cultivation box, substrate sponge and plant roots, which will also have a certain impact on the growth of plants.

Through the filter device, the green algae are removed from the water and centrifuged, but this method is costly and requires constant replacement of the filter element. The ultraviolet germicidal lamp can also be used for sterilization, but it will increase energy consumption and is not necessarily economical. The use of algaecides to kill algae is an exploration. The common polyaluminum chloride is effective in purifying pond water, but aluminum can cause damage to the brain and nervous system and cannot be directly used as a nutrient solution for hydroponic plants. Considering that under low light conditions, vegetables will slow down the absorption of nutrients such as Mg, N, P, etc.; therefore, it is necessary to redesign and improve the nutrient solution of the balcony hydroponic vegetable garden from the perspective of the nutrient solution formula.

SUMMARY OF THE INVENTION

The technical problem to be solved by the invention is to overcome the problem that the hydroponic nutrient solution is prone to grow green algae and become odorous, and to provide a hydroponic nutrient solution formula and a preparation method that can meet the growth requirements of a variety of vegetables, inhibit the growth of green algae, and enable vegetables to grow healthily in a weak light environment.

The technical solutions adopted by the invention are: the invention comprises a basic nutrient solution and an algae inhibitory substance, wherein the basic nutrient solution comprises major elements, minor elements and trace elements.

The specific ratio is: 1000 mg/L of calcium nitrate, 1000 mg/L of potassium nitrate, 200 mg/L of EDTA-FeNa, 200 mg/L of potassium dihydrogen phosphate, 150 mg/L of ammonium dihydrogen phosphate, 700 mg/L of magnesium sulfate, 7 mg/L of boric acid, 5 mg/L of manganese sulfate, 15 mg/L of ferrous sulfate, 0.25 mg/L of copper sulfate, 0.22 mg/L of zinc sulfate, 0.02 mg/L of ammonium molybdate, and 0.01 mg/L of benzalkonium chloride.

The specific nutrient element content is: 313.28 mg/L of N, 88 mg/L of P, 444.16 mg/L of K, 169.7 mg/L of Ca, 69.02 mg/L of Mg, 164.902531 mg/L of S, 0.063625 mg/L of Cu, 3.0135 mg/L of Fe, 1.6255 mg/L of Mn, 0.050006 mg/L of Zn, 1.2236 mg/L of B, 0.0109 mg/L of Mo, and 0.0020 mg/L of Cl.

Preferably, the benzalkonium chloride can provide Cl ions, and it has a good bactericidal and algae-killing ability in different pH value ranges; the optimal dosage is 0.01 mg/L; it can effectively penetrate the green algae cell wall and decompose the DNA of the green algae cells, thereby killing and inhibiting the algae reproduction.

Preferably, potassium dihydrogen phosphate has the function of overcoming the nutrient deficiency caused by the decline of the absorption capacity of the root system in the late stage of crop growth.

Preferably, disodium ethylenediaminetetraacetic acid dihydrate is used as heavy metal detoxifier, complexing agent, antioxidant synergist, stabilizer and softener, etc.

Preferably, concentrating 100 times to form a prepared mother liquor, which is liquor A, liquor B, liquor C, and liquor D; wherein liquor A includes calcium nitrate, liquor B includes potassium nitrate and EDTA-FeNa, liquor C includes potassium dihydrogen phosphate, ammonium dihydrogen phosphate, magnesium sulfate, boric acid, manganese sulfate, ferrous sulfate, copper sulfate, zinc sulfate and ammonium molybdate, and liquor D includes benzalkonium chloride.

The formula of the invention is reasonable, comprehensively utilizes calcium nitrate, potassium nitrate, and EDTA-FeNa, potassium dihydrogen phosphate, ammonium dihydrogen phosphate, magnesium sulfate, boric acid, manganese sulfate, ferrous sulfate, copper sulfate, zinc sulfate, ammonium molybdate, benzalkonium chloride, etc. to improve the utilization of nutrient solution components, fully matches the nutrients in the formula, and is suitable for the growth of leafy vegetables; the coordination of the various components in the formula meets the nutrient requirements of the whole life cycle of leafy vegetables; by adjusting the ratio of each component in the nutrient solution, it can well meet the growth requirements of leafy vegetables and can well match the growth of leafy vegetables.

DETAILED DESCRIPTION OF THE PREFERRED EMBODIMENTS

The invention will be further described in detail hereinafter through specific embodiments. The following embodiments are only descriptive and not restrictive, and cannot limit the protection scope of the invention at one time.

Unless otherwise specified, the methods used in the following embodiments are conventional methods; unless otherwise specified, the raw materials used are analytically pure chemicals.

1. First determining the concentration of the cultivation nutrient solution and the required volume (ml);
2. calculating the ratio of the concentration of mother liquor to the concentration of cultivation nutrient solution, that is, the multiple relationship between the two;
3. calculating how many ml each of the four mother liquors A, B, C and D are needed to prepare the cultivation nutrient solution of the specified concentration and volume;
4. taking a measuring cup of appropriate volume; first adding ⅔ volume of water, then adding mother liquor A, stirring evenly, and then slowly adding mother liquor B, stirring evenly, no precipitation production is allowed; then slowly adding mother liquor C, stirring evenly, and finally adding water to make the volume up to the specified volume;
5. pouring the prepared cultivation nutrient solution into a small watering can for spray watering of seedlings.

Nutrient Solution Preparation Process:

in order to avoid the interaction of various fertilizers and the influence of pH on the dissolution, the nutrient solution is divided into A, B, C, and D solutions, and they are added sequentially during use. First, weighing various fertilizers according to the amount of nutrient solution to be configured.

Liquor A (Volume: 1 L)

First dissolving the calcium nitrate in warm water, and stirring while adding water until it is uniformly dissolved.

Liquor B (Volume: 1 L)

First dissolving EDTA-FeNa with warm water, then adding potassium nitrate, and adding water and stirring until it is completely dissolved.

Liquor C (Volume: 1 L)

First dissolving ferrous sulfate in warm water, adding boric acid in warm water, then adding manganese sulfate, copper sulfate, zinc sulfate, ammonium molybdate, etc., and mixing and stirring.

Liquor D (Volume: 1 L)

First dissolving the benzalkonium chloride in warm water, then adding water and stirring until it is uniformly dissolved Using Process:

When using the nutrient solution, adding liquor A first at the ratio of 10 mL to 1 kg of water, then adding liquor B after it is fully dissolved, and finally adding liquor C and liquor D.

Adjusting the pH of the nutrient solution directly affects the state, transformation and effectiveness of the nutrients in the nutrient solution. Phosphate is prone to precipitation when it is alkaline; deficiencies of manganese, iron, etc., due to reduced solubility in alkaline solutions, may also occur. The nutrient solution is usually prepared with well water or tap water. If the pH value of the water source is neutral or slightly alkaline, the pH value of the prepared nutrient solution is similar to that of the water source, and adjustments should be made if it does not match. When adjusting the pH value, the strong acid and alkali should be diluted with water first. When the nutrient solution is too alkaline, using phosphoric acid or sulfuric acid to neutralize. When it is acidic, using sodium hydroxide to neutralize, and then adding dropwise to the nutrient solution, while continuously measuring with pH test paper up to the required pH (the pH value of vegetable nutrient solution is 5.5-6.5).

Replacing the nutrient solution with tap water 2-3 days before picking, which can replace the accumulation of fertilizer in the plant and improve the taste and quality of vegetables.

Compared with the prior art, the invention has the advantageous effects as follows.

1. The invention uses benzalkonium chloride as an algae inhibitor to remove green algae grown in the process of hydroponic cultivation of leafy vegetables. Benzalkonium chloride has the advantages of non-toxic, odorless, and pollution-free; it has relatively stable chemical properties, is easy to transport, has strong water solubility, is harmless to the environment and has no bioaccumulation.
2. The hydroponic soilless cultivation nutrient for inhibiting the growth of green algae provided by the invention is a nutrient solution specifically for hydroponic soilless cultivation, which can meet the needs of various elements in the process of hydroponic growth, with large leaves and well-developed roots.
3. The hydroponic nutrient solution for inhibiting the growth of green algae provided by the invention can effectively inhibit the growth of green algae in hydroponic soilless culture, and further improve the ornamental value of soilless culture and hydroponics, so as to facilitate the promotion of hydroponic soilless culture; the clearance rate of green algae is 95%.

The above are only the preferred embodiments of the invention. It should be pointed out that several modifications and improvements may be made by those skilled in the art without departing from the structure of the invention, which shall be regarded as the protection scope of the invention, and will not affect the implementation effect of the invention and the practicability of the patent.

What is claimed is:

1. A nutrient solution formula for inhibiting green algae, comprising a basic nutrient solution and an algae inhibitory substance, wherein the basic nutrient solution comprises major elements, minor elements and trace elements, the basic nutrient solution is: 1000 mg/L of calcium nitrate, 1000 mg/L of potassium nitrate, 200 mg/L of EDTA-FeNa, 200 mg/L of potassium dihydrogen phosphate, 150 mg/L of ammonium dihydrogen phosphate, 700 mg/L of magnesium sulfate, 7 mg/L of boric acid, 5 mg/L of manganese sulfate, 15 mg/L of ferrous sulfate, 0.25 mg/L of copper sulfate, 0.22 mg/L of zinc sulfate, 0.02 mg/L of ammonium molybdate, and 0.01 mg/L of benzalkonium chloride.

2. The nutrient solution formula according to claim 1, wherein the benzalkonium chloride can provide Cl ions, and it has a bactericidal and algae-killing ability in different pH value ranges; the dosage is 0.01 mg/L; it can effectively penetrate the green algae cell wall and decompose the DNA of the green algae cells, thereby killing and inhibiting the algae reproduction.

\* \* \* \* \*